(12) United States Patent
Hasegawa

(10) Patent No.: US 7,336,094 B2
(45) Date of Patent: Feb. 26, 2008

(54) CARRIAGE FOR LIQUID CRYSTAL MODULE

(75) Inventor: Yuuichi Hasegawa, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 142 days.

(21) Appl. No.: 11/391,206

(22) Filed: Mar. 29, 2006

(65) Prior Publication Data

US 2007/0229109 A1    Oct. 4, 2007

(30) Foreign Application Priority Data

Mar. 29, 2005    (JP) .............................. 2005-095890

(51) Int. Cl.
    *G01R 31/00*    (2006.01)
    *G01R 31/02*    (2006.01)

(52) U.S. Cl. ...................................... 324/770; 324/760

(58) Field of Classification Search .................... None
    See application file for complete search history.

(56) References Cited

U.S. PATENT DOCUMENTS

| 5,801,545 A | * | 9/1998 | Takekoshi et al. .......... 324/770 |
| 6,486,927 B1 | * | 11/2002 | Kim .............................. 349/1 |
| 7,245,142 B2 | * | 7/2007 | Tanaka et al. .............. 324/770 |

FOREIGN PATENT DOCUMENTS

| JP | 2002-5977 | 1/2002 |
| JP | 2002-19612 | 1/2002 |

* cited by examiner

*Primary Examiner*—Ernest Karlsen
(74) *Attorney, Agent, or Firm*—Young & Thompson

(57) ABSTRACT

A plurality of individually retractable racks on which a single module is mounted on each rack is disposed on the upper and middle tiers of a portable carriage main body. Provided to the lower tier of the carriage main body are a operating panel for setting work content and conditions; a signal source for selectively outputting a circuit adjustment signal, an aging testing signal, and a display inspection signal; a power supply for circuit adjustment, a power supply for aging testing, and a power supply for display inspection; and an output unit for selecting an operation from circuit adjustment, aging testing, and display inspection on the basis of the work content and work conditions that have been input in the operating panel, and feeding the power and signals for the selected operation to the modules.

14 Claims, 8 Drawing Sheets

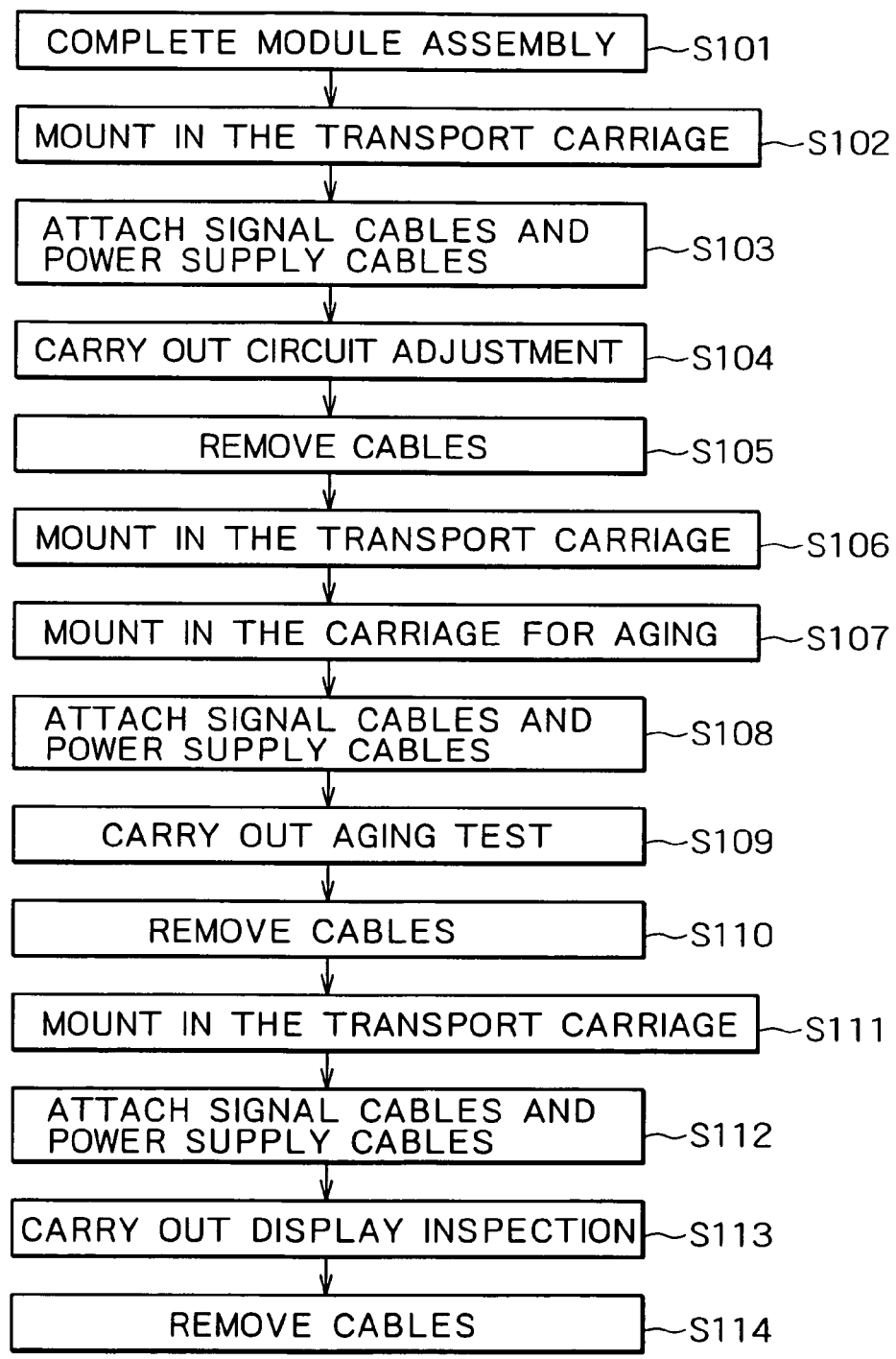

CARRIAGE FOR LIQUID CRYSTAL MODULE

BACKGROUND OF THE INVENTION

1. Field of the Invention

The present invention relates to a carriage for liquid crystal modules in which liquid crystal modules are loaded and aging tests or the like are carried out in the manufacture of the liquid crystal display device.

2. Description of the Related Art

In the manufacture of a color liquid crystal display device, an aging test is carried out after module assembly has been completed, and there has been proposed in prior art a carriage for aging that is designed to reduce the number of processes and improving the work efficiency during the aging test by adopting a carriage structure that allows modules to be transported (see Japanese Laid-Open Patent Application Nos. 2002-5977 and 2002-19612, for example). FIG. 8A is a front view that schematically shows the carriage for aging that is described in Japanese Laid-Open Patent Application No. 2002-5977, and FIG. 8B is a side view of the same. The carriage for aging 110 described in Japanese Laid-Open Patent Application No. 2002-5977 is provided with a product rack 102 on which a plurality of modules 103 can be mounted on the upper tier of the portable carriage main body 101, as shown in FIGS. 8A and 8B. The front side of the carriage main body 101 is provided with an operating panel 106 for setting voltages and signals that are suitable for the specifications of the modules 103.

The middle and lower tiers of the carriage main body 101 are provided with a DC power supply 104 for driving the modules 103, a digital signal source 105 that generates digital signals for driving the modules 103, a control circuit 107 for controlling the power and signals that are output to the modules 103 on the basis of values set using the operating panel 106, and an output circuit 108 for distributing a plurality of drive signals and feeding the signals to the modules 103. The operating panel 106 is provided with a power supply input connector 109 for connecting an external power supply cable 111.

Described next is the operation of the carriage for aging 110, more specifically, a conventional method for manufacturing a liquid crystal display device in which the carriage for aging 110 is used. FIG. 9 is a flowchart showing a conventional method for manufacturing a liquid crystal display device in which the carriage for aging 110 is used. FIG. 9 shows only the aging test and the preceding and subsequent circuit adjustment and display inspection operations. When the assembly of the modules 103 is completed (step S101) in the case that a conventional carriage for aging 110 is used, the modules 103 are placed on a transport carriage and transported to the circuit adjustment step (step S102), as shown in FIG. 9. In the circuit adjustment step, the modules 103 are placed one at a time on an inspection stand on a work desk, and signal and power cables are connected to the modules 103 (step S103). A prescribed pattern is thereafter displayed on the modules by operating a signal generator and a DC power supply to carry out circuit adjustment (step S104). After circuit adjustment is completed, the signal and power cables are detached from the modules 103 (step S105).

Next, the modules 103 are placed on a transport carriage and transported to the aging step (step S106). In the aging step, a plurality of modules 103 are mounted on the product rack 102 on the carriage main body 101 (step S107). The signal and power cables provided to the product rack 102 are thereafter connected to the modules 103, and the external power supply cable 114 is connected to the power supply input connector 109 provided to the carriage main body 101 (step S108). Next, the voltages and signals for driving the modules 103 are set in the operating panel 106, and aging testing is carried out (step S109). At this time, power and signals are output from the control circuit 107 in accordance with the conditions that have been set by using the operating panel 106 in the carriage for aging 110. The output for driving the modules is distributed by the output circuit 108 and is fed to each of the plurality of modules 103. A plurality of modules 103 can thereby be simultaneously subjected to aging testing. When high-temperature aging testing is carried out, the settings are input using operating panel 106, after which the carriage for aging 110 is placed in a high-temperature atmosphere.

When display inspection is carried out after aging testing, the signal and power cables connected to the modules 103 are detached, and the external power supply cable 114 is detached from the power supply input connector 109 (step S110). The modules 103 are then reloaded onto the transport carriage and are carried to the display inspection step (step S111). In the display inspection step, the modules 103 are loaded one by one onto the inspection stand on the work table, and the signal and power cables are connected to the modules 103 (step S112), after which the modules are lighted up or prescribed patterns are displayed on the modules by operating the signal generator and DC power supply to carry out the display inspection (step S113). After the display inspection operation is completed, the signal and power cables are detached from the modules 103 (step S114).

Disclosed in Japanese Laid-Open Patent Application No. 2002-19612 is a carriage for aging that is provided with a plurality of drawer shelves within the carriage main body that can travel on wheels, and in which the liquid crystal modules are set on the drawer shelves and the aging test is carried out. The carriage for aging is configured so that the display state of the modules can be visually examined by pulling out the drawer shelves.

However, the prior art described above has the following problems. The carriage for aging of the prior art described in Japanese Laid-Open Patent Application No. 2002-5977 cannot carry out display inspection that is to be performed from the front of the modules because the modules are disposed in a single row front to back. With the carriage for aging of the prior art described in Japanese Laid-Open Patent Application No. 2002-5977, circuit adjustment cannot be carried out because the flicker volume disposed on the front or back side of the modules cannot be adjusted. In the carriage for aging described in Japanese Laid-Open Patent Application No. 2002-19612, the display surface can be checked, but when the flicker volume is disposed on the back side, circuit adjustment cannot be carried out. Since the voltage applied to the liquid crystal modules and the patterns that are displayed are each different for circuit adjustment, aging testing, and display inspection, circuit adjustment and display inspection cannot be carried out with the power supply and signal source for aging testing that are provided to the carriage of Japanese Laid-Open Patent Application Nos. 2002-5977 and 2002-19612.

Thus, with the conventional carriages for aging described in Japanese Laid-Open Patent Application Nos. 2002-5977 and 2002-19612, only aging testing can be performed. With the conventional method for manufacturing liquid crystal displays, extra labor is required and the number of steps and personnel increases since attaching and detaching operations of the modules must be carried out for each of the circuit adjustment, aging testing, and display inspection steps which are carried out after the completion of module assembly. Also, since the modules are attached and detached many times, defects occur more readily due to connector damage. Furthermore, in the conventional methods for manufacturing liquid crystal displays, since the signal and power cables that are connected to the modules are different for each step, the number of cables that are used is considerable. These problems can be prevented by sharing cables that are used in each step, but doing so increases the chance that the cables and connectors will be damaged due to the greater number of times that a single cable is attached and detached.

SUMMARY OF THE INVENTION

An object of the present invention is to provide a carriage for liquid crystal modules that can reduce the number of steps in circuit adjustment, aging testing, and display inspection, and in which the chance of damage to module connectors is reduced.

The carriage for liquid crystal modules according to the first aspect of the present invention comprises a movable carriage main body;

a module mount unit for mounting a plurality of liquid crystal modules and allowing the liquid crystal modules to be individually retracted;

a data inputting unit for inputting operation data; and a signal feeding unit for selecting an operation from circuit adjustment, aging test and display inspection on the basis of said operation data and feeding power and signals for the selected operation to liquid crystal modules mounted in said mounting unit.

In the present invention, an output unit is provided in which the mounted modules can be individually pulled out of the carriage, an operation is selected from circuit adjustment, aging testing, and display inspection on the basis of the work content and the work conditions input in the input unit, and power and signals for the selected operation are fed to the liquid crystal modules. Therefore, circuit adjustment, aging testing, and display inspection can be carried out without detaching the liquid crystal modules. The number of steps in circuit adjustment, aging testing, and display inspection can be reduced, and the chance of damage to module connectors is reduced because the number of times that cables are attached and detached is reduced.

The signal feeding unit may be provided with a first power supply for outputting power to perform circuit adjustment; a second power supply for outputting power to perform aging test; a third power supply for outputting power to perform display inspection; a signal source for selectively outputting one of a signal from a circuit adjustment signal, an aging test signal and a display inspection signal; a control unit for selecting an operation from circuit adjustment, aging test and display inspection according to said operation data, outputting power for the selected operation from the first, second or third power supply and outputting the signal from the signal source; and an output unit for outputting the power from said first, second or third power supply and the signals from the signal source to said plurality of liquid crystal modules. Production equipment and space can thereby be reduced and production efficiency can be improved because a single carriage can be used for a plurality of steps.

The mounting unit may have a plurality of retractable racks, and each of said racks has a room for a single liquid crystal module. The operating efficiency of circuit adjustment and display inspection can thereby be improved because the liquid crystal modules can be easily pulled out and returned.

The data inputting unit may have an operating panel or a bar code reader, for example. The work content and work conditions can thereby be easily input.

The carriage for liquid crystal modules may have a plurality of said output units of n in number (where n is an integer that is 2 or larger), wherein said mounting units have rooms for n types of liquid crystal modules with different specifications. The manufacturing time can thereby be reduced because a plurality of modules can be processed in a single cycle.

In the present invention, the mounted modules can be individually pulled out of the carriage; an operation is selected from circuit adjustment, aging testing, and display inspection on the basis of the work content and the work conditions that has been input; and power and signals for the selected operation are fed to the liquid crystal modules that are mounted on the mounting unit. Therefore, all of the processes of circuit adjustment, aging testing, and display inspection can be carried out on the carriage. Production equipment and space can thereby be reduced and production efficiency can be improved. Also, the chance of damage to connectors is reduced because the number of times that cables are attached and detached is reduced, and the module production yield can be improved.

The step for feeding power and signals to the liquid crystal modules may comprise selecting an operation from circuit adjustment, aging testing, and display inspection on the basis of work content and work conditions that are input to the input unit; outputting power for the selected operation from a first power supply for outputting power to perform circuit adjustment, from a second power supply for outputting power to perform aging testing, or from a third power supply for outputting power to perform display inspection, and outputting a signal for the selected operation from a signal source that selectively outputs a circuit adjustment signal, an aging testing signal, and a display inspection signal; and outputting from the output unit to the plurality of liquid crystal modules power that is output from the power supplies and signals that are output from the signal source.

The carriage for liquid crystal modules is provided with n number (where n is an integer that is 2 or higher) of the output units; and circuit adjustments, aging tests, and display inspections are carried out for n types of liquid crystal modules with different specifications. Production efficiency can thereby be improved.

In accordance with the present invention, it is possible to individually pull out liquid crystal modules that are mounted on a carriage, and an output unit is provided for selecting an operation from circuit adjustment, aging testing, and display inspection on the basis of the work content and work conditions that have been input to the input unit, and feeding power and signals for the selected operation to the liquid crystal modules. Therefore, circuit adjustment, aging testing, and display inspection can be carried out without detaching and reattaching the liquid crystal modules, the number of steps in these operations can be reduced, and the chance of damage to the module conneceters is decreased.

BRIEF DESCRIPTION OF THE DRAWINGS

FIG. 9 is a flowchart showing a method for manufacturing a liquid crystal display device in which the carriage for aging shown in FIG. 8 is used.

DESCRIPTION OF THE PREFERRED EMBODIMENTS

Figure 1A:
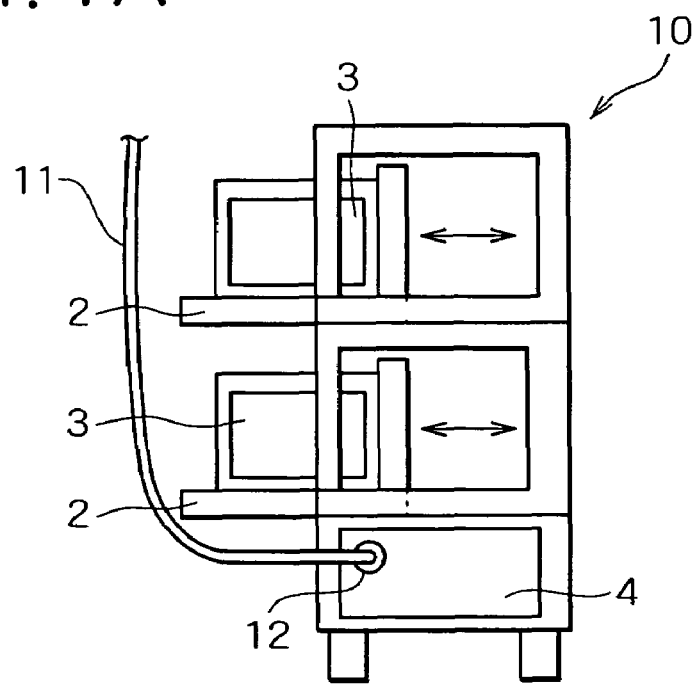
FIG. 1A is a front view that schematically shows the carriage for liquid crystal modules of the first embodiment of the present invention.
Figure 1B:
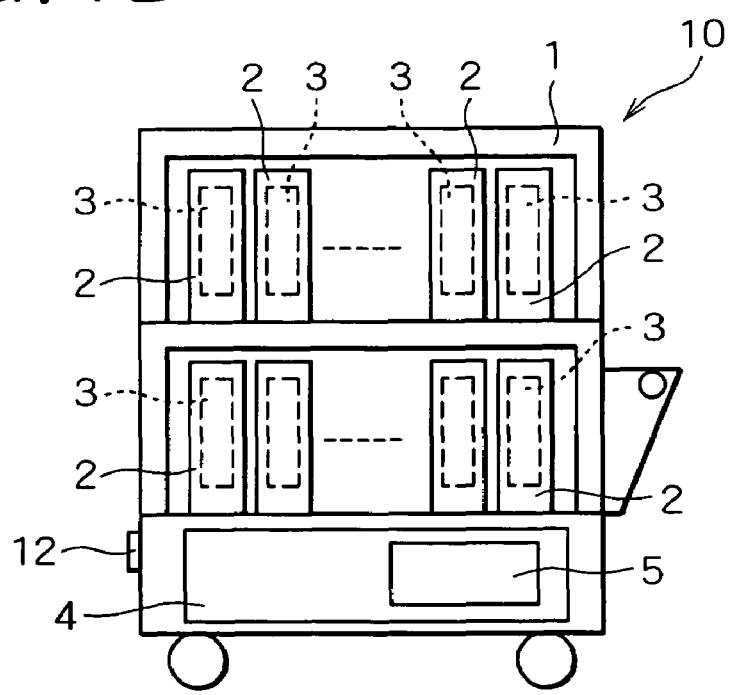
FIG. 1B is a side view of the same.

The carriage for liquid crystal modules of the embodiments of the present invention is described in detail below with reference to the attached diagrams. FIG. 1A is a front view that schematically shows the carriage for liquid crystal modules of the present embodiment, and FIG. 1B is a side view of the same. The carriage for liquid crystal modules 10 of the present embodiment is provided with a plurality of individually retractable racks 2 in which a single module 3 is mounted on each rack on the upper and middle tiers of a portable carriage main body 1, as shown in FIGS. 1A and 1B. The lower tier of the carriage main body 1 has a feed unit 4 for feeding power and signals to the modules 3, and an operating panel 5 for setting the work content and setting the power and signals to specifications that are suitable for each module. A power supply input connector 12 is connected to the feed unit 4 and serves to connect an external power supply cable 11.

Figure 2:
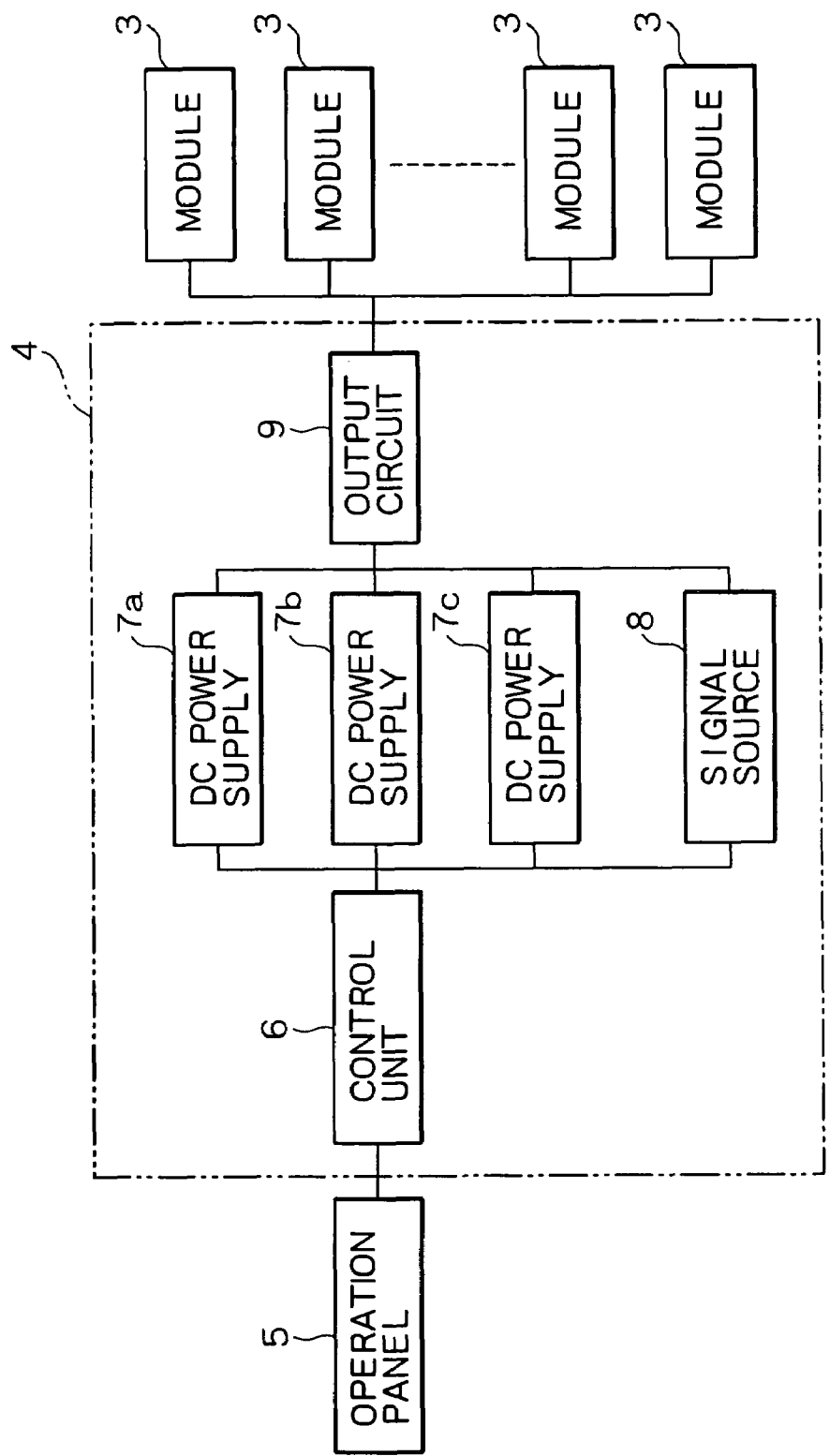
FIG. 2 is a block diagram showing the configuration of the control unit shown in FIG. 1.

FIG. 2 is a block diagram showing the feed unit 4 of the carriage for liquid crystal modules 10 of the present embodiment. The feed unit 4 of the carriage for liquid crystal modules has three DC power supplies 7a to 7c for driving the modules 3, and a signal source 8 for generating digital signals for driving the modules 3, as shown in FIG. 2. Disposed between the operating panel 5 and the DC power supplies 7a to 7c and signal source 8 is a control unit 6 for selecting an operation from circuit adjustment, aging testing, and display inspection; outputting power for the selected operation from the DC power supplies 7a to 7c; and outputting signals for the selected operation from the signal source 8 on the basis of the work content and work conditions that have been set using the operating panel 5. Disposed between the modules 3 and the DC power supplies 7a to 7c and the signal source 8 is an output circuit 9 as an output unit for presenting a plurality of modules 3 with signals that are output from the signal source 8 and with power that is output from the DC power supplies 7a to 7c. The DC power supplies 7a to 7c each have different specifications and are suitably selected in accordance with the work content. For example, the DC power supply 7a is selected by the control unit 6 when circuit adjustment is carried out, the DC power supply 7b is selected by the control unit 6 when aging testing is carried out, and the DC power supply 7c is selected by the control unit 6 when display inspection is carried out.

Figure 3:
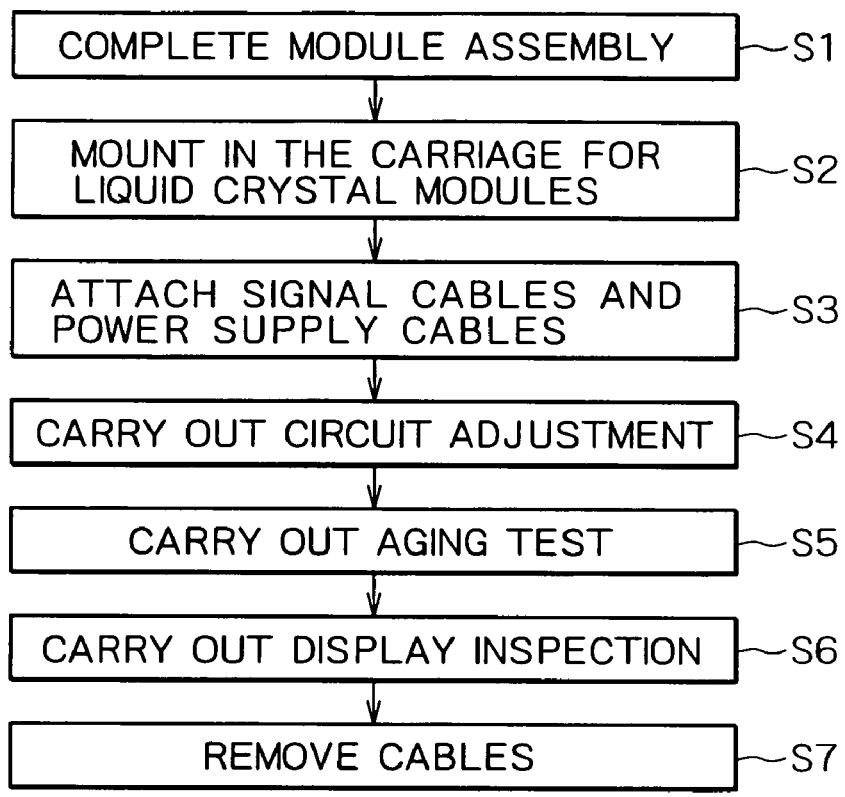
FIG. 3 is a flowchart showing the method for manufacturing a liquid crystal display device in which the carriage for liquid crystal modules shown in FIG. 1 is used.

Described next is the operation of the carriage for liquid crystal modules 10 of the present embodiment, more specifically, the method for manufacturing a liquid crystal display device in which the carriage for liquid crystal modules 10 is used. FIG. 3 is a flowchart showing the method for manufacturing a liquid crystal display device in which the carriage for liquid crystal modules 10 of the present embodiment is used. Shown in FIG. 3 are only the circuit adjustment step, the aging testing step, and the display inspection step of the method for manufacturing a liquid crystal display device. In the method for manufacturing a liquid crystal display device of the present embodiment, the assembly of the modules 3 is completed (step S1), and a single module 3 is then mounted on each of the retractable racks 2 disposed on the upper and middle tiers of the carriage main body 1 of the carriage for liquid crystal modules 10 (step S2), as shown in FIG. 3. Signal and power cables provided to each of the racks 2 are connected to the modules 3, after which the external power supply cable 11 is connected to the power supply input connector 12 that is provided to the feed unit 4 (step S3).

Figure 4:
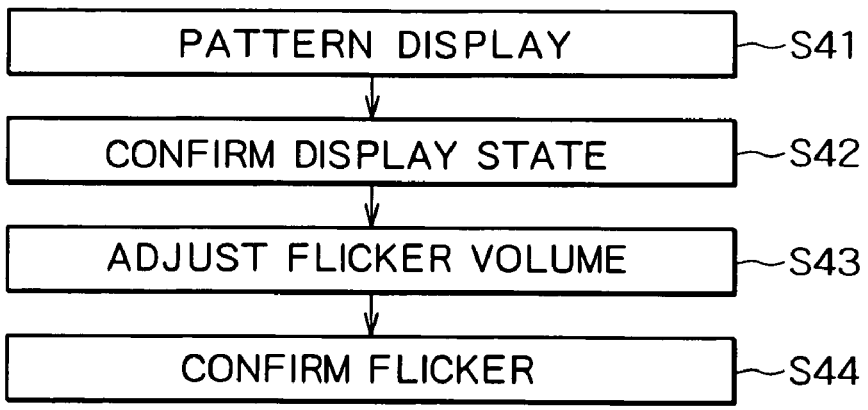
FIG. 4 is a flowchart showing the circuit adjustment steps shown in FIG. 3.

Next, circuit adjustment is carried out for each module 3 (step S4). FIG. 4 is a flowchart showing the circuit adjustment step. In the circuit adjustment step, "circuit adjustment" is first specified as the work content, the conditions of the selected operation are input in the operating panel 5 as shown in FIG. 4; the modules 3 are lighted; and a circuit adjustment pattern is displayed by outputting from the feed unit 4 the power and signals for circuit adjustment (step S41). At this time, in the feed unit 4, the control unit 6 selects "circuit adjustment" and causes power to be output from DC power supply 7a, and a circuit adjustment signal to be output from signal source 8. The power that is output from the DC power supply 7a, and the circuit adjustment signal that is output from the signal source 8, are output to a plurality of modules 3 from the output circuit 9. A pattern for circuit adjustment is thereby displayed on the plurality of modules 3 mounted on the carriage for liquid crystal modules 10.

Next, a single rack 2 is pulled out and the display state of the module 3 mounted on the rack 2 is visually confirmed (step S42), and the flicker volume provided to the module 3 is adjusted in accordance with the display state (step S43). Flicker is then visually checked, after which the rack 2 on which the module 3 are mounted are returned to its original position (step S44). The steps S42 to S44 described above are carried out for all the modules 3.

Figure 5:
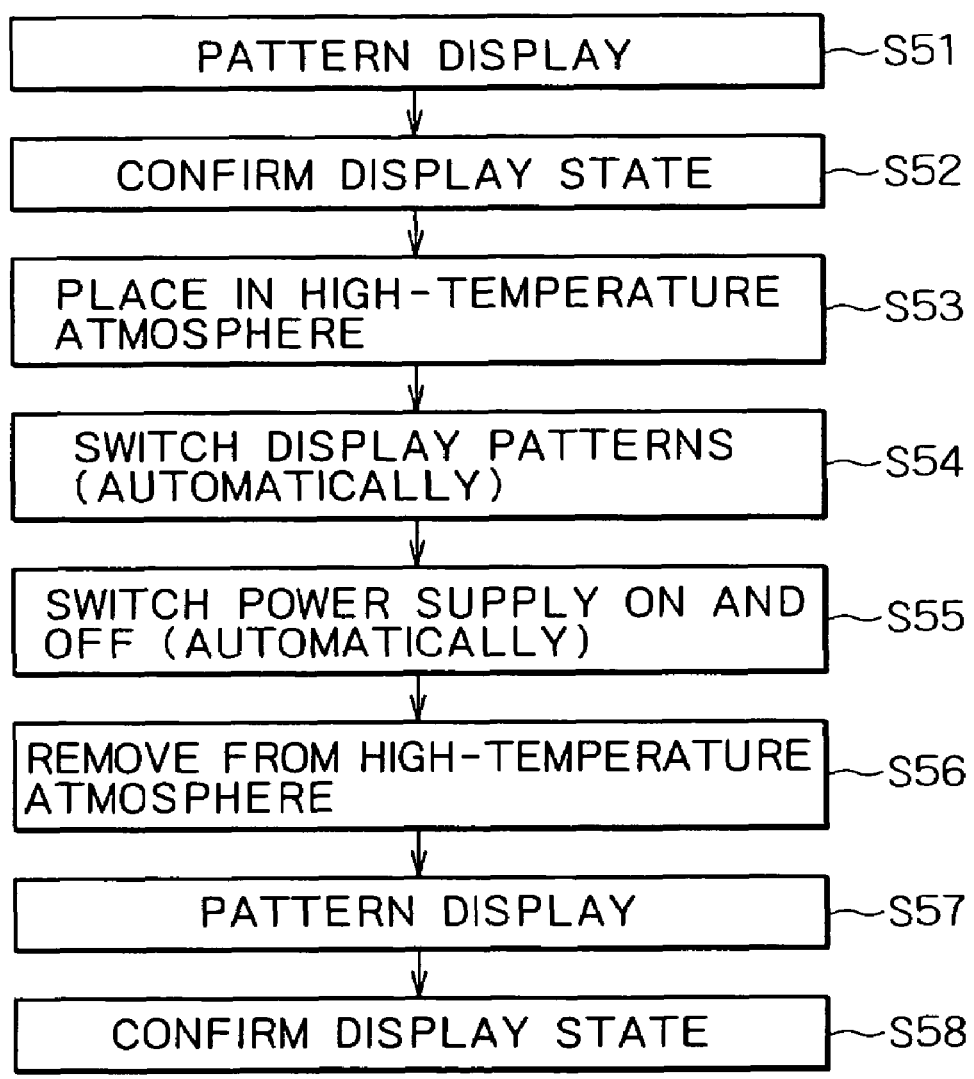
FIG. 5 is a flowchart showing the aging testing steps shown in FIG. 3.

After circuit adjustment has been completed for all the modules 3, aging testing is carried out, as shown in FIG. 3 (step S5). FIG. 5 is a flowchart showing the aging testing steps. In the aging test, the operating panel 5 is first switched to the aging test mode, the aging test conditions are input in the operating panel 5, and an aging test pattern is displayed by outputting aging test power and signals from the feed unit 4 to the modules 3, as shown in FIG. 5 (step S51). In this case, in the feed unit 4, the control unit 6 selects "aging testing," power is output from the DC power supply 7b, and an aging testing signal is output from the signal source 8. The power that is output from the DC power supply 7b, and the aging testing signal that is output from the signal source 8, are output to a plurality of modules 3 from the output circuit 9. A pattern for aging testing is thereby displayed on the plurality of modules 3 mounted on the carriage for liquid crystal modules 10.

Next, the racks 2 are pulled out of the carriage in sequence, and the display state of all the modules 3 is visually confirmed (step S52), after which the carriage for liquid crystal modules 10 on which the modules 3 are mounted is placed in a high-temperature atmosphere (step S53). The pattern displayed on the modules 3 is automatically varied in the high-temperature atmosphere by the feed unit 4 (step S54), and the power supply of each module 3 is also automatically switched ON and OFF by the feed unit 4 (step S55). The carriage for liquid crystal modules 10 is thereafter removed from the high-temperature environment (step S56), and the pattern displayed in step S51 is displayed on the modules again (step S57). The racks 2 are pulled out of the carriage in sequence, and the display state of all the modules 3 is visually confirmed to end the aging test (step S58).

Figure 6:
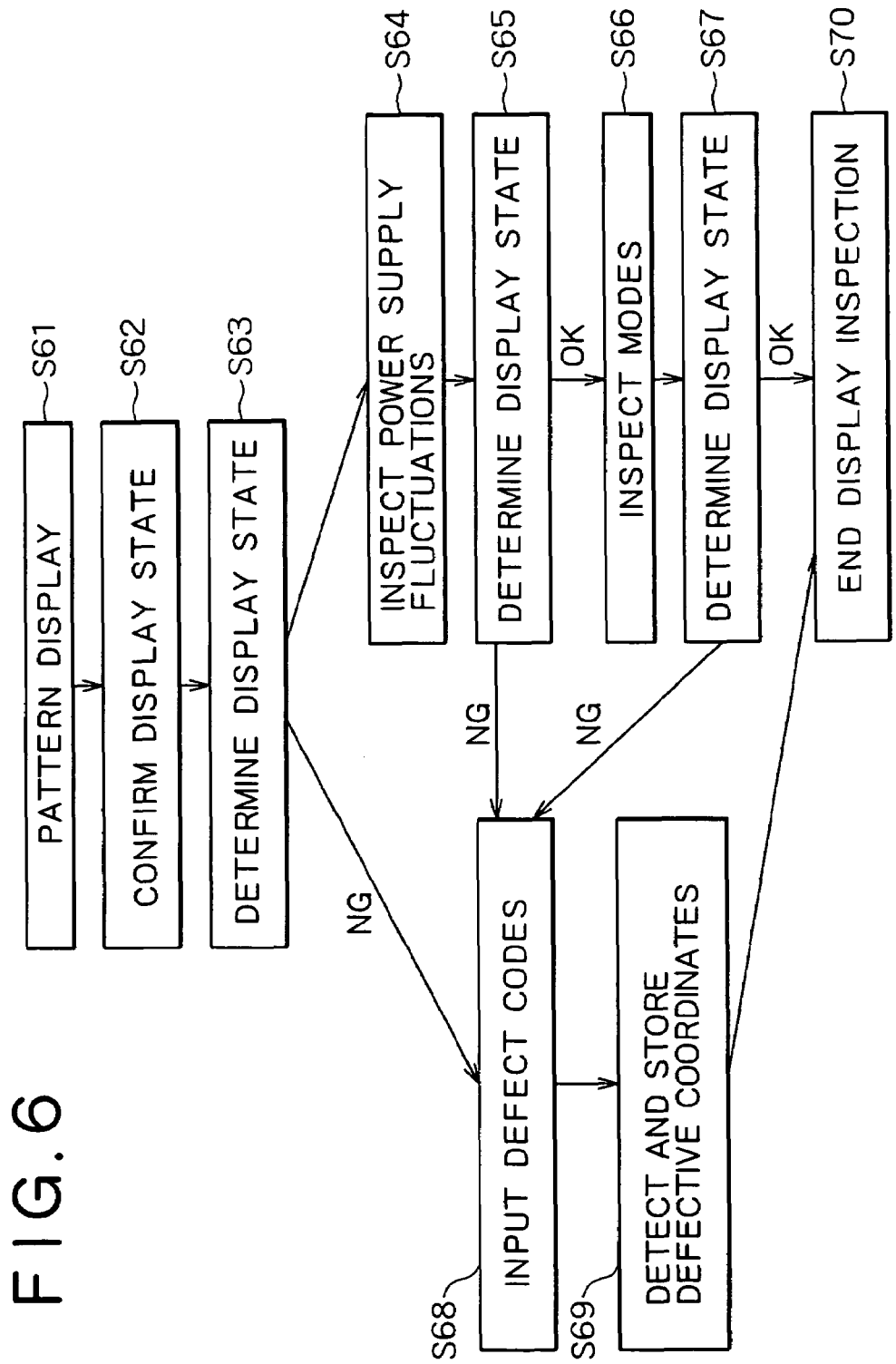
FIG. 6 is a flowchart showing the display inspection steps shown in FIG. 3.

Next, display inspection is carried out, as shown in FIG. 3 (step S6). FIG. 6 is a flowchart showing the display inspection testing steps. In display inspection, the operating panel 5 is first switched to the display inspection mode, the display inspection conditions are input in the operating panel 5, and a display inspection pattern is displayed on the modules 3 by outputting display inspection power and signals from the feed unit 4, as shown in FIG. 6 (step S61). In this case, the control unit 6 selects "display inspection" in the feed unit 4, power is output from the DC power supply 7c, and a display inspection signal is output from the signal source 8. The power that is output from the DC power supply 7c, and the display inspection signal that is output from the signal source 8, are output to a plurality of modules 3 from the output circuit 9. A pattern for display inspection is thereby displayed on the plurality of modules 3 mounted on the carriage for liquid crystal modules 10.

Next, a single rack 2 is pulled out and the display state of the module 3 mounted on the rack 2 is visually confirmed (step S62), and a determination is made whether the display state is normal (step S63). If the display state is normal, power supply fluctuation is visually inspected (step S64), and a determination is made whether the display state is normal (step S65). When the result is that the display state is normal, display inversion switching and other mode inspections are manually carried out (step S66). When the operation is normal (step S67), the rack 2 is returned to its original position, and the display inspection of the module 3 is ended (step S70). On the other hand, when the display state or the operation is determined to be "abnormal" in steps S63, S65, and S67, the defect code is manually input (step S68), the coordinates of the defective position are manually detected and saved (step S69), the rack 2 is then returned to its original position, and the display inspection for the module 3 is ended (step S70). The steps S62 to S70 described above are carried out for all the modules 3. After the display inspection is ended for all modules 3, the signal and power cables are detached from the modules 3, as shown in FIG. 3 (step S7).

Figure 8A:
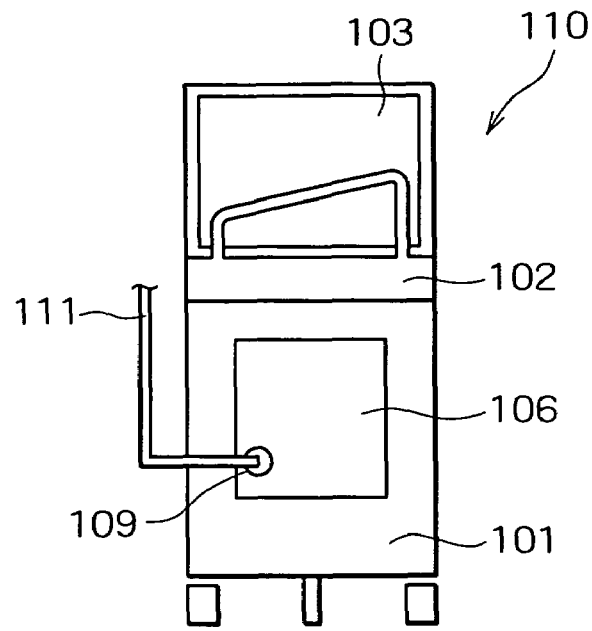
FIG. 8A is a front view that schematically shows the carriage for aging that is described in Japanese Laid-Open Patent Application No. 2002-5977.
Figure 8B:
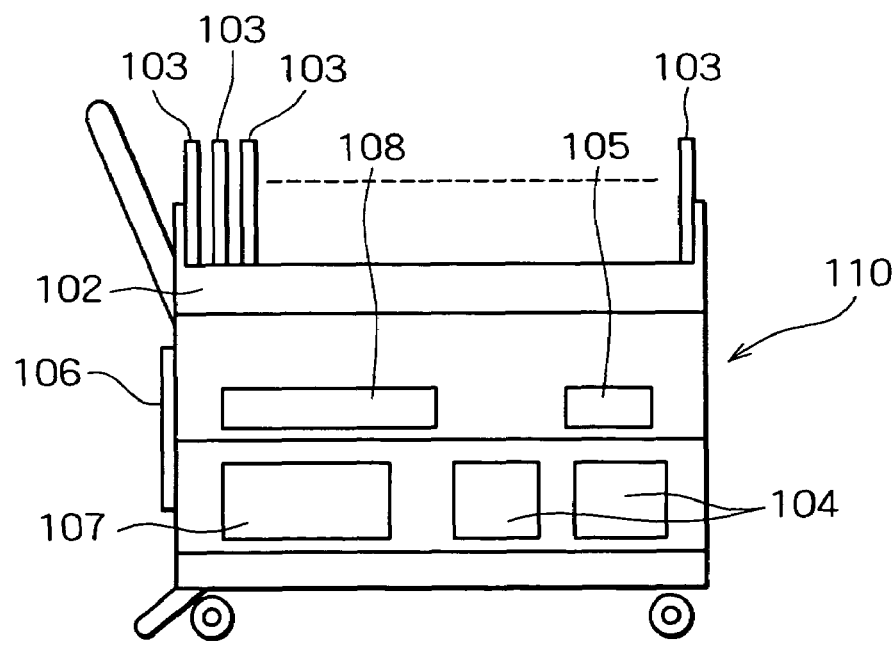
FIG. 8B is a side view of the same.

In the carriage for liquid crystal modules 10 of the present embodiment, the racks 2 are retractable and the modules 3 can be individually pulled out. Also, three types of DC power supplies 7a to 7c with different specifications are provided to the feed unit 4 for circuit adjustment, aging, and display inspection; and a circuit adjustment pattern signal, aging pattern signal, and display inspection pattern signal can be output from the signal source 8. Since a control unit 6 is provided for controlling the power and signals on the basis of data that has been input in the operating panel 5, it is possible to continuously perform circuit adjustment, aging testing, and display inspection without detaching and reattaching the modules 3. As a result, the number of steps, work hours, workers, and work space in these operations can be considerably reduced in comparison with the conventional method shown in FIG. 8. Since the number of times that the cables are attached and detached is reduced, the occurrence of connector damage of the modules can be inhibited.

Since different patterns must be displayed on the modules for each of the operations of circuit adjustment, aging testing, and display inspection, a special signal source was conventionally used for each operation, but the signal source 8 provided to the feed unit 4 of the carriage for liquid crystal modules 10 of the present embodiment is provided with a display pattern editing function for each type of operation, and with an automatic and manual display function for each display pattern, making it possible to output signals corresponding to work content to the modules. In addition, display patterns can be switched at high speed, coordinates of defects can be detected during display inspection, and save and transfer functions are provided. Therefore, the feed unit 4 can be made smaller, the feed unit 4 and operating panel 5 can be accommodated on the lower tier of the carriage main body 1, and the modules 3 can be mounted on the middle and upper tiers. As a result, the number of modules 3 that can be mounted can be increased by 1.5 times in comparison with a conventional carriage for aging, making it possible to improve work efficiency.

Figure 7A:
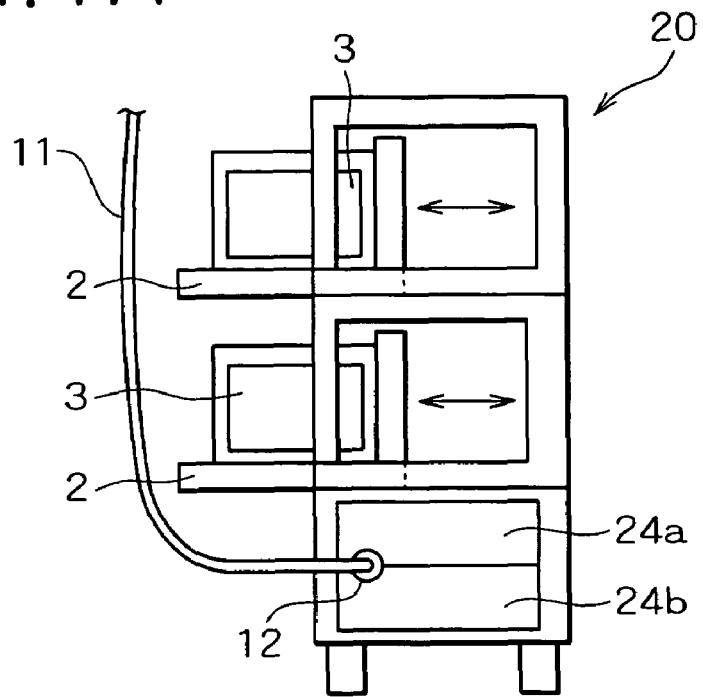
FIG. 7A is a front view that schematically shows the carriage for liquid crystal modules of the second embodiment of the present invention.
Figure 7B:
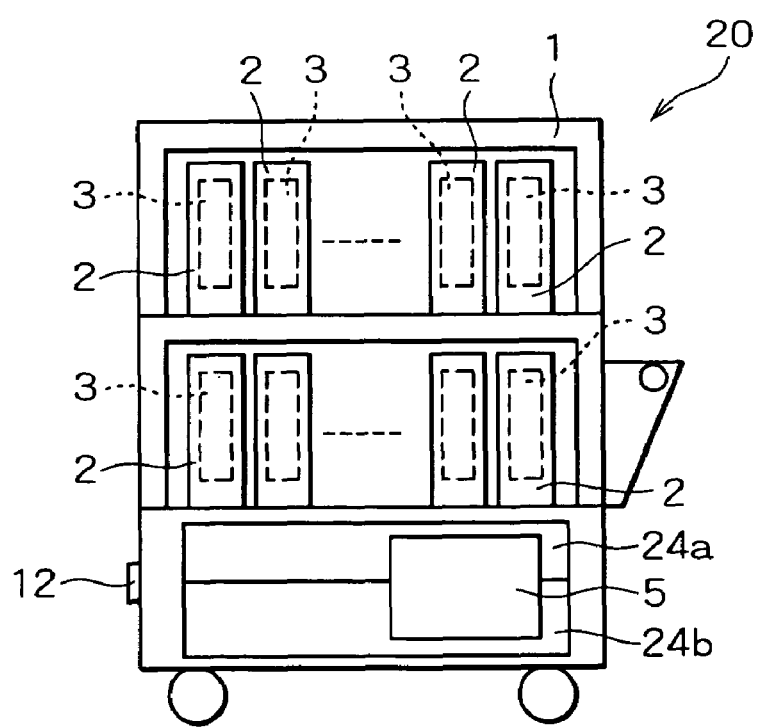
FIG. 7B is a side view of the same.

Described next is a carriage for liquid crystal modules of the second embodiment of the present invention. FIG. 7A is a front view that schematically shows the carriage for liquid crystal modules of the present invention, and FIG. 7B is a side view of the same. In FIGS. 7A and 7B, the same reference numerals are assigned to the same constituent elements of the carriage for liquid crystal modules 10 of the first embodiment shown in FIGS. 1A and 1B, and a detail description is omitted. The carriage for liquid crystal modules 20 of the present embodiment is provided with two feed units on the lower tier of the carriage main body 1: a feed unit 24a for feeding power and signals to the modules 3 mounted on the upper tier of the carriage main body 1, and a feed unit 24b for feeding power and signals to the modules 3 mounted on the middle tier of the carriage main body 1, as shown in FIGS. 7A and 7B. The feed units 24a and 24b are both connected to the operating panel 5 and share a power supply input connector 12 for connecting an external power supply cable 11.

In the carriage for liquid crystal modules 20 of the present embodiment, circuit adjustment, aging testing, and display inspection can be simultaneously carried out for modules of different types (specifications) on the upper and middle tiers of the carriage main body 1. The configuration and results other than those described above with reference to the carriage for liquid crystal modules 20 are the same as those of the carriage for liquid crystal modules 10 of the first embodiment described above. Other than the feature in which the conditions are input individually for the feed unit 24a and feed unit 24b using the operating panel 5, the operation, that is, the method for manufacturing a liquid crystal display device by using the carriage for liquid crystal modules 20 is also the same as the operation of the carriage for liquid crystal modules 10 of the first embodiment shown in FIGS. 3 to 6.

In the carriage for liquid crystal modules of the first and second embodiments described above, the work content and work conditions are input using an operating panel, but the present invention is not limited to this option alone, and a bar code reader may be used as the input unit in lieu of an operating panel, and the conditions may be separately set for the type (specifications) of work and modules by reading the article name seal of the bar code label that is attached to the modules.

What is claimed is:

1. A carriage for liquid crystal modules, comprising:
    a movable carriage main body;
    a module mount unit for mounting a plurality of liquid crystal modules and allowing the liquid crystal modules to be individually retracted;
    a data inputting unit for inputting operation data; and
    a signal feeding unit for selecting an operation from circuit adjustment, aging test and display inspection on the basis of said operation data and feeding power and signals for the selected operation to liquid crystal modules mounted in said mounting unit.

2. The carriage for liquid crystal modules according to claim 1, wherein said signal feeding unit comprises:
    a first power supply for outputting power to perform circuit adjustment;
    a second power supply for outputting power to perform aging test;
    a third power supply for outputting power to perform display inspection;
    a signal source for selectively outputting one of a signal from a circuit adjustment signal, an aging test signal and a display inspection signal;
    a control unit for selecting an operation from circuit adjustment, aging test and display inspection according to said operation data, outputting power for the selected operation from said first, second or third power supply and outputting the signal from said signal source; and
    an output unit for outputting the power from said first, second or third power supply and the signals from said signal source to said plurality of liquid crystal modules.

3. The carriage for liquid crystal modules according to claim 1, wherein the mounting unit has a plurality of retractable racks, and each of said racks has a room for a single liquid crystal module.

4. The carriage for liquid crystal modules according to claim 2, wherein the mounting unit has a plurality of retractable racks, and each of said racks has a room for a single liquid crystal module.

5. The carriage for liquid crystal modules according to claim 1, wherein said data inputting unit has an operating panel or a bar code reader.

6. The carriage for liquid crystal modules according to claim 2, wherein said data inputting unit has an operating panel or a bar code reader.

7. The carriage for liquid crystal modules according to claim 3, wherein said data inputting unit has an operating panel or a bar code reader.

8. The carriage for liquid crystal modules according to claim 1, having:
    a plurality of said output units of n in number (where n is an integer that is 2 or larger)
    wherein said mounting units have rooms for n types of liquid crystal modules with different specifications.

9. The carriage for liquid crystal modules according to claim 2, having:
    a plurality of said output units of n in number (where n is an integer that is 2 or larger)
    wherein said mounting units have rooms for n types of liquid crystal modules with different specifications.

10. The carriage for liquid crystal modules according to claim 3, having:
    a plurality of said output units of n in number (where n is an integer that is 2 or larger)
    wherein said mounting units have rooms for n types of liquid crystal modules with different specifications.

11. The carriage for liquid crystal modules according to claim 4, having:
    a plurality of said output units of n in number (where n is an integer that is 2 or larger)
    wherein said mounting units have rooms for n types of liquid crystal modules with different specifications.

12. The carriage for liquid crystal modules according to claim 5, having:
    a plurality of said output units of n in number (where n is an integer that is 2 or larger)
    wherein said mounting units have rooms for n types of liquid crystal modules with different specifications.

13. The carriage for liquid crystal modules according to claim 6, having:
    a plurality of said output units of n in number (where n is an integer that is 2 or larger)
    wherein said mounting units have rooms for n types of liquid crystal modules with different specifications.

14. The carriage for liquid crystal modules according to claim 7, having:
    a plurality of said output units of n in number (where n is an integer that is 2 or larger)
    wherein said mounting units have rooms for n types of liquid crystal modules with different specifications.

* * * * *